United States Patent [19]
Lal et al.

[11] Patent Number: 5,569,533
[45] Date of Patent: Oct. 29, 1996

[54] THIN-FILM MEDIUM WITH SUBLAYER

[75] Inventors: Brij B. Lal; Allen J. Bourez, both of San Jose, Calif.; Tadashi Shinohara, Niiharu-gun, Japan

[73] Assignee: HMT Technology Corporation, Fremont, Calif.

[21] Appl. No.: 212,151

[22] Filed: Mar. 14, 1994

[51] Int. Cl.$^6$ ..................................................... G11B 5/66
[52] U.S. Cl. .................... 428/332; 428/336; 428/611; 428/636; 428/655; 428/656; 428/661; 428/663; 428/668; 428/678; 428/694 TS; 428/694 TP; 428/694 TM; 428/900; 204/192.1
[58] Field of Search .................... 428/694 TS, 694 TP, 428/694 TM, 900, 611, 636, 655, 656, 661, 663, 668, 678, 336, 332; 204/192.1

[56] References Cited

U.S. PATENT DOCUMENTS

| | | | |
|---|---|---|---|
| 4,833,020 | 5/1989 | Shiroishi et al. | 428/336 |
| 5,037,515 | 8/1991 | Tsai et al. | 204/192.15 |
| 5,051,288 | 9/1991 | Ahlert et al. | 428/65.7 |
| 5,082,747 | 1/1992 | Hedgcoth | 428/611 |

OTHER PUBLICATIONS

Katayama et al "Magnetic Properties and Read–Write Characteristics of Multilayer Films on a Glass Substrate" IEEE Trans. Mag. vol. 24, No. 6 (1988) pp. 2892–2894.

Chen, G. L., "New Longitudinal Recording Media $Co_xNi_y$-$Cr_z$ from High Rate Static Magnetron Sputtering System," IEEE Trans. on Magnetics 22(5):334 (1986).

Duan, S. L., et al., "The Dependence of the Microstructure and Magnetic Properties of CoNiCr/Cr Thin Films on the Substrate Temperature," IEEE Trans. on Magetics 26(5): 1587 (1990).

Fisher, R. D., et al., "Effect of Rf Substreate Bias on Crystallie Orientation of Chromium and Magnetic Characteristics of 84% Co–16% Cr Films," IEE Trans. on Magnetics 26(1):109 (1990).

Ishikawa, M., et al., "High Coercivity and Circumferencial Magnetic Anistropy Hard Disk with Glass Substrate," paper BP-04, Intermag. Conf. (1990).

Kogure, T., et al., "High–Coercivity Magetic Hard Disks Using Glass Substrates," J. Appl. Phys. 67(9):4701 (1990).

Lal, B. B., et al., "A New Series of Quaternary Co–Alloys for High Density Rigid–Disk Applications," IEEE Trans. on Magnetics 27(6):4739 (1991).

Laughlin, D. E., and Wong, B. Y., "The Crystallography and Texture of Co–Based Thin Film Deposited on Cr Underlayers," IEEE Trans. on Magnetics 27(6):4713 (1991).

Mirzamaani, M., et al., "Orientation Ratio of Sputtered Thin–Film Disks," J. Appl. Phys. 67(9):4695 (1990).

Pressesky, J., et al., "Crystallography and Magnetic Properties of CoCrTa Films Prepared on Cr Underlayers with Different Substrate Bias Conditions," J. Appl. Phys. 69(8):5163 (1991).

Tsai, H. C., et al., "Preferred Orientation in Cr– and Co–Based Thin Films and its Effects on the Read/Write Performance of the Media," J. Appl. Phys. 71(7):3579 (1992).

Tsai, H. C., "Advantage and Challenge of Nonmetallic Substrates for Rigid Disk Applications," IEEE Trans. on Magnetics 29(1):241 (1993).

Primary Examiner—Leszek Kiliman
Attorney, Agent, or Firm—Judy M. Mohr; Peter J. Dehlinger

[57] ABSTRACT

A longitudinal magnetic recording medium formed on a non-metallic substrate and a method of forming the medium is disclosed. A sublayer formed of a chromium alloy having a thickness between 3–50 Å is deposited on the substrate, followed by a chromium-based underlayer. A cobalt-based magnetic recording layer is sputtered over the underlayer. The medium is characterized by improved coercivity, HF signal amplitude and signal-to-noise ratio.

12 Claims, 6 Drawing Sheets

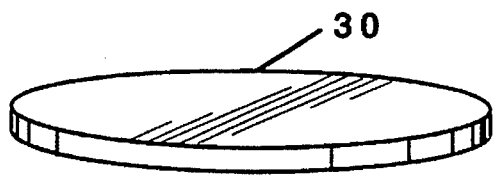
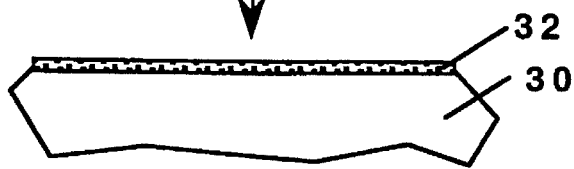
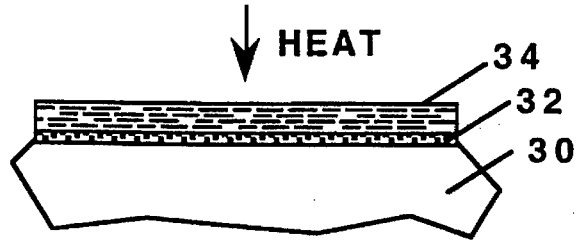
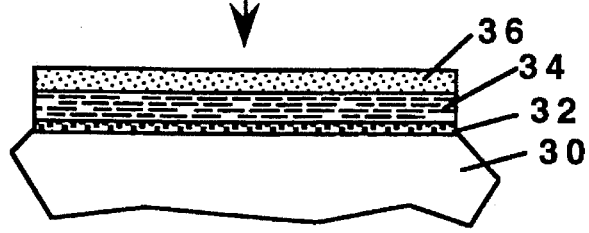
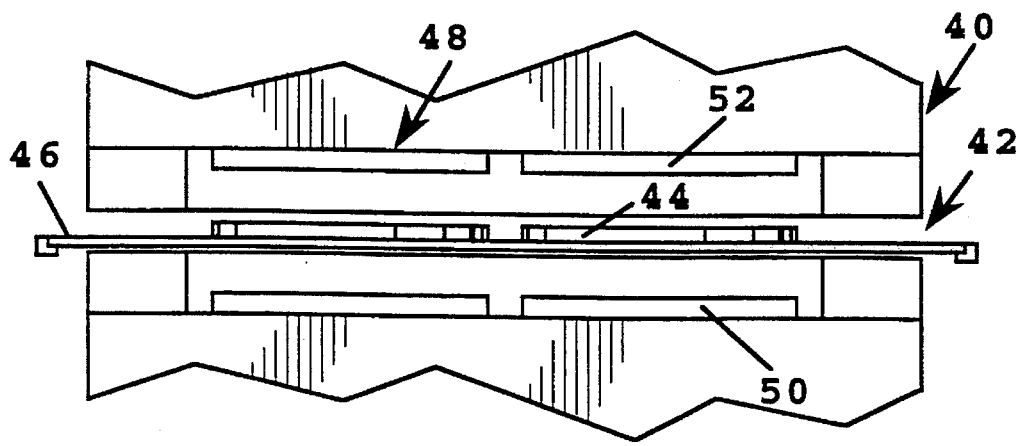
Fig. 1A
Fig. 1B
Fig. 1C
Fig. 1D
Fig. 2

THIN-FILM MEDIUM WITH SUBLAYER

FIELD OF THE INVENTION

The present invention relates to a longitudinal thin-film magnetic recording medium formed on a non-metallic substrate and having a chromium or chromium-based alloy sublayer. A method of producing the medium is also described.

REFERENCES

Chen G. -L., *IEEE Trans. Mag.*, 22:334 (1986)
Duan L. S., et al., *IEEE Trans. Mag.*, 26:1587 (1990)
Fisher, R. D., et al., *IEEE Trans. Mag.*, 26(1):109 (1990)
Hedgcoth, V. L., U.S. Pat. No. 5,082,747, issued Jan. 21, 1992
Ishikawa, M., et al., paper BP-04, *Intermag. Conf.* 1990
Kogure, T., et al., *J. Appl. Phys.* 67(9):4701 (1990)
Lal, B. B., et al., *IEEE Trans. Mag.*, 27(6):4739 (1991)
Laughlin, D. E., et al., *IEEE Trans. Mag.*, 27:4713 (1991)
Lazzari, J. P., et al., *IEEE Trans. Mag.*, 3:205 (1967)
Mirzamaani, M., et al., *J. Appl. Phys.* 67(9):4695 (1990)
Tsai, H. -C., et al., U.S. Pat. No. 5,037,515, issued Aug. 6, 1991
Tsai, H. -C., et al., *J. Appl. Phys.* 71:3579 (1992)
Tsai, H. -C., et al., *IEEE Trans. Mag.*, 29(1):241 (1993)
Pressesky, J., et al., *J. Appl. Phys.* 69(8):5163 (1991)

BACKGROUND OF THE INVENTION

Maximizing the areal density of recording is necessary for miniaturization and for lowering the cost per bit of computer data-storage technology. Reducing the head-to-medium spacing, or the flying height, is one of the more effective ways to achieve a higher density on a rigid disk. However, to have read/write heads flying over the disk surfaces at submicrometer spacing, the topography of the disk surface must be very uniform and the textured nickel-phosphorus aluminum (NiP/Al) substrates used in most media do not meet this requirement. Therefore, a different substrate is needed to provide a better surface allowing the head to fly closer to the disk.

Glass and ceramic substrates are potential candidates for such an application, as the rigidity of these materials is advantageous in making thinner disk substrates and the hardness eliminates the need for electroless NiP plating. Most importantly, glass and ceramic provide a superior smoothness and flatness which are not achievable on the current NiP/Al substrates.

However, the magnetic recording properties of media prepared on a glass or glass-ceramic substrate have been found to be inferior to media prepared on a NiP/Al substrate (Tsai, 1993). In particular, the coercivity of media formed on glass substrates is low, often less than 1000 Oe (Fisher).

It is well known that the chromium underlayer in longitudinal recording media significantly enhances the coercivity of cobalt alloy films (Lazzari). Structural analyses have shown that cobalt alloy films can grow epitaxially on chromium under appropriate conditions. As a result, the crystallographic orientation and grain size, which directly influence the magnetic recording properties, of cobalt alloy films are determined primarily by the chromium underlayer (Laughlin, Mirzamaani, Chen).

Similarly, the crystallographic orientation of the chromium underlayer, which influences the overlying magnetic layer and the ultimate recording properties, is related to the substrate material. On NiP/Al substrates, the crystallographic orientation Cr(200) normally occurs. However, on glass-ceramic substrates a Cr(110) orientation is observed (Tsai, 1992). The Cr(200) orientation has been shown to give epitaxial growth for most cobalt alloy media resulting in media with a high coercivity and good recording properties (Tsai, 1992, Duan, Lal, Pressesky).

Because of the advantages of glass or glass-ceramic as a substrate, various approaches to improving the recording properties of media formed on non-metallic substrates have been reported. For example, sublayers of NiP (Ishikawa), Ti (Kogure), and Cr (Hedgcoth, Tsai 1991) between the chromium underlayer and the glass substrate have been applied. Alternatively, application of a bias, DC or rf, to the substrate has been investigated as a means to improve the recording properties of media formed on a glass substrate (Fisher, Ishikawa).

SUMMARY OF THE INVENTION

It is, therefore, an object of the present invention to provide a magnetic recording medium formed on a nonmetallic substrate.

It is also an object of the invention to provide a method for producing a magnetic recording medium on a nonmetallic substrate.

The invention includes, in one aspect, a magnetic recording medium, having (i) a non-metallic substrate; (ii) a sputtered sublayer composed of a chromium-based alloy; (iii) a sputtered chromium-based underlayer having a thickness between 200–3,000 Å; (iv) a sputtered cobalt-based magnetic layer having a thickness between 100–800 Å; and (v) a wear-resistant overcoat.

The sublayer has a thickness between 3–50 Å and is composed of a chromium-based alloy, such as Cr—Si, Cr—V, or Cr—Gd. In one embodiment, the sublayer is formed of Cr—Gd and has a thickness between 10–30 Å. In another embodiment, the sublayer is formed of Cr—V and has a thickness between 10–30 Å.

Media formed according to this aspect of the invention are characterized by a substantially higher signal-to-noise ratio than the same medium having a sublayer formed of chromium alone.

The magnetic recording layer of the medium, in another embodiment, is composed of first and second magnetic sublayers separated by a chromium isolation layer.

In another aspect, the invention includes an improvement in a method of producing a magnetic recording medium by (a) sputtering onto a non-metallic substrate a chromium-based underlayer having a thickness of between 200–3,000 Å, and (b) sputtering a cobalt-based alloy onto the underlayer to form a magnetic thin-film layer having a thickness between 100–800 Å. The improvement, which is effective to enhance the HF signal amplitude by at least 10%, includes (i) sputtering a sublayer onto the non-metallic substrate, between the underlayer and the substrate; and (ii) prior to sputtering the underlayer, stopping the sublayer sputtering when a sublayer thickness of between 3–50 Å is reached.

In accordance with the method, the sublayer may be composed of chromium, or in an alternative embodiment, the sublayer is composed of an alloy such as Cr—Gd, Cr—V, or Cr—Si.

In another aspect, the invention includes a magnetic recording medium having (i) a non-metallic substrate; (ii) a sputtered chromium sublayer having a thickness between 3–50 Å; (iii) a sputtered chromium-based underlayer having a thickness between 200–3,000 Å; (iv) a sputtered cobalt-based magnetic layer having a thickness between 100–800 Å; and (v) a wear-resistant overcoat.

In one embodiment, the sublayer is between 10–30 Å in thickness and the medium is characterized by a HF signal amplitude which is at least 25% higher than the same medium in the absence of said sublayer.

In an alternative embodiment, the sublayer is between 10–30 Å in thickness and the medium is characterized by a media noise which is at least 20% lower than the same medium in the absence of said sublayer.

The magnetic layer of the magnetic recording medium, in another embodiment, is composed of first and second magnetic sublayers separated by a chromium isolation layer.

These and other objects and features of the invention will be more fully appreciated when the following detailed description of the invention is read in conjunction with the accompanying drawings.

BRIEF DESCRIPTION OF THE DRAWINGS

FIGS. 1A–1D illustrate features of the substrate, the sublayer, the underlayer and the magnetic recording layer as these appear during production of a magnetic disc in accordance with the invention;

FIG. 2 is a schematic illustration of a portion of a sputtering apparatus used in forming the magnetic recording medium of the invention;

DETAILED DESCRIPTION OF THE INVENTION

I. Thin Film Recording Medium

Figure 3A:
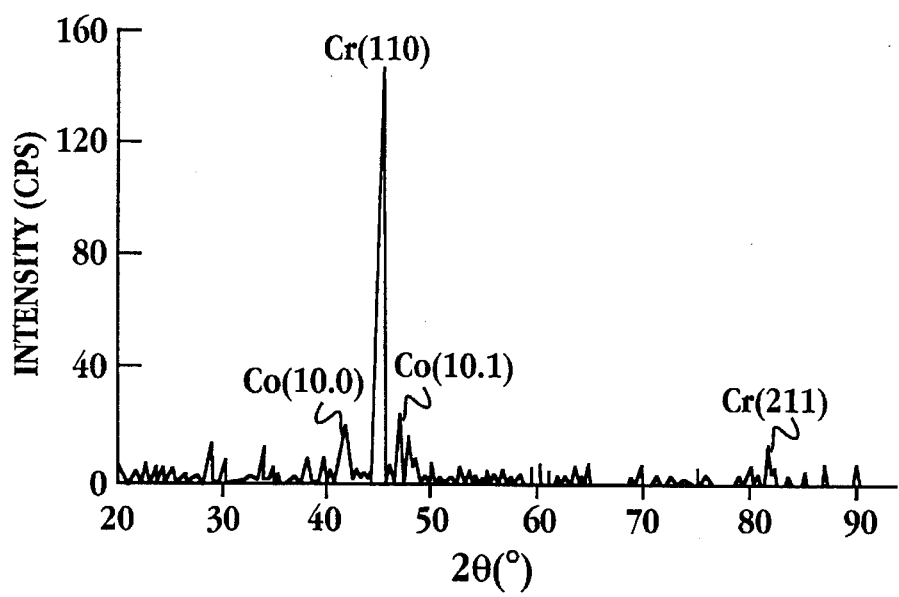
FIGS. 3A and 3B are x-ray diffraction patterns of a medium formed in accordance with the invention (FIG. 3A) and of a magnetic recording medium having a NiP/Al substrate (FIG. 3B)

FIG. 1 illustrates features of the substrate, the sublayer, the underlayer and the magnetic recording layer as these appear during production of a magnetic disc in accordance with the invention. Seen in FIG. 1A is a substrate 30 for use in forming a thin-film medium. The substrate is a non-metallic, textured substrate, by which is meant a substrate formed of glass, ceramic material, glass-ceramic, carbon, silicon, silicon carbide or a heat-resistant polymer which can be prepared with a highly uniform or smooth surface. The surface of the substrate is textured, yet is sufficiently smooth such that, in the finished disc, the flying head height can be as little as 1 μinch and has acceptable friction during contact-start-stop.

Suitable types of glass include soda-lime and aluminosilicate glasses. One preferred substrate is an aluminosilicate glass substrate having a highly polished surface, a thickness of about 0.025 inch, and a diameter of 1.8 inches (48 mm). Smooth-surfaced substrates of this type are commercially available from Hoya (Japan), NSG (Japan), and Pilkington (U.K.). Ceramic materials which are suitable for substrates in the invention include Canasite™ manufactured by Corning Glass and crystallized glass manufactured by Ohaua (Japan) and Yamamura (Japan).

A sublayer, seen at 32 in FIG. 1B, is first sputtered onto the non-metallic substrate to a thickness of at least about 3K but less than about 50 Å. The sublayer may be formed of either chromium or of a chromium-based alloy, such as Cr—Si, Cr—V, Cr—Ti or Cr—Gd. Typically, these chromium-based alloys will contain at least 50% chromium. Preferred alloys include Cr—V and Cr—Gd.

The sublayer when sputtered to a thickness of less than about 50 Å may be a discontinuous film, that is the chromium or chromium-based alloy deposited on the substrate may not form a continuous layer.

When the sublayer has reached the desired thickness of between about 3–50 Å, the sputtering is stopped and the sublayer-coated substrate is heated to a temperature between about 100°–500° C.

An underlayer 34 is then sputtered onto the heated sublayer-coated substrate, as illustrated in FIG. 1C. The underlayer is chromium-based, that is the underlayer may be formed of chromium or of a chromium-based alloy, such Cr—Si, Cr—V, Cr—Gd, or Cr—Ti. The previously formed sublayer provides a substrate having a different surface energy and conductivity than the substrate surface alone. The underlayer is deposited to a thickness between about 200–3,000 Å.

As discussed above, the crystallographic orientation of the underlayer influences the magnetic layer crystal orientation during formation of the magnetic layer, which in turn, influences the magnetic recording properties of the medium. Experiments in support of the present invention indicate that the underlayer when formed of chromium has a (110) crystallographic orientation. This orientation is indicated in FIG. 1C where the crystal plane in underlayer 34 lies in the plane of the substrate. That is, the chromium underlayer has a high anisotropic parallel/perpendicular crystal orientation ratio.

Following formation of the underlayer, a magnetic layer 36 (FIG. 1D) is sputtered, to a desired thickness, preferably between 100–800 Å. The magnetic layer is, preferably, formed of a cobalt-based alloy, by which is meant an alloy containing at least 50% cobalt. Exemplary alloys include Co/Cr or Co/Ni binary alloys. The alloy may also be a ternary, quaternary, or five-element alloy, such as Co/Cr/Ta, Co/Ni/Pt, Co/Ni/Cr, Co/Cr/Ta/Pt, Co/Ni/Cr/Pt, or Co/Cr/Ni/Pt/B.

Alternatively, the thin-film magnetic layer may be a multilayer structure composed of two or more magnetic thin-film sublayers, each separated by a thin isolation layer, such as a 2–50 Å chromium isolation layer.

While not shown in FIG. 1D, the magnetic recording medium may be coated, also by sputtering, with a protective, wear-resistant overcoat of carbon, silicon oxide, silicon nitride or the like.

As will be seen below, the media of the present invention, formed with a nonmetallic substrate and a sublayer or either chromium or of a chromium-based alloy have improved coercivities, an increased signal-to-noise ratio and a higher HF signal amplitude when compared to media having no sublayer.

II. Method of Producing the Medium

FIG. 2 shows a schematic, fragmentary portion of a sputtering apparatus 40 which is used for producing the magnetic recording medium to be described. The apparatus includes a vacuum chamber 42 having at least four stations at which sputtering or heating operations occur. A heating station (not shown) at the upstream end of the chamber has a plurality of infrared lights which are arrayed for heating both sides of a substrate, such as substrate 44, carried through the station in the chamber on a pallet 46.

Just downstream of the heating chamber is a first sputtering chamber 48 at which a sublayer is formed on a substrate, in a manner to be described. The chamber includes a pair of targets, such as targets 50, 52, effective to sputter chromium or a chromium-based alloy onto opposite sides of a substrate.

A second sputtering station (not shown in FIG. 2) downstream of chamber 42 is designed for sputtering the underlayer onto the sublayer. The station includes a pair of sputtering targets for sputtering chromium or a chromium-based alloy used in forming the underlayer.

A third sputtering station (not shown) downstream of the second sputtering station is designed for sputtering a magnetic film onto the underlayer. Also included here is a pair of sputtering targets for sputtering a cobalt-based alloy, such as those mentioned above, used in forming the magnetic thin film.

Also included in the apparatus, but not shown here, is a final downstream station at which an overcoat is sputtered on both sides of the magnetic disc.

The basic sputtering apparatus is preferably a commercial system, such as those available from Circuits Processing Apparatus (Fremont, Calif.), ULVAC (Japan), Leybold Heraeus (Germany), VACTEC (Boulder, Colo.), or Materials Research Corporation (Albany, N.Y.). These systems are double-sided, in-line, high-throughput machines having two interlocking systems, for loading and unloading.

In practicing the method of the invention, the nonmetallic substrate is placed on a pallet, such as pallet 46, in a sputtering apparatus, and the vacuum chamber is evacuated, e.g., to a vacuum of about $10^{-7}$ Torr. The substrate is moved through the heating chamber and into the first sputtering chamber, where the sublayer, composed of chromium or of a chromium-based alloy, is formed.

The sublayer is sputtered to a thickness of between about 3–50 Å. The thickness of the sublayer is controlled by the speed of substrate movement into and through the first sputtering chamber, and the rate of sputtering in the chamber.

It has been discovered that stopping or momentarily interrupting the sputtering when the sublayer has reached a thickness of between about 3–50 Å, results in improved magnetic recording properties. While the sputtering is stopped, the sublayer-coated substrate is heated to a temperature of between about 100°–500° C.

Experiments performed in support of the invention show that media having a sublayer formed by sputtering a thin layer, stopping the sputtering and heating the sublayer-coated substrate have improved recording properties when compared to a medium formed with no sublayer. It may be that the sublayer allows the substrate to be heated quickly and efficiently, relative to a nonmetallic substrate with no sublayer. Alternatively, oxidation of the sublayer may occur during the phase when the sputtering is stopped. It may also be that a sublayer-coated substrate has a different surface energy than an uncoated substrate, influencing formation of the underlayer and the magnetic recording layer.

The heated sublayer-coated substrate is moved again in a downstream position to a second sputtering chamber, where the chromium or chromium-based alloy underlayer is formed. The underlayer when formed of chromium has a predominately (110) crystallographic orientation, as can be seen in FIG. 3A, which is discussed below. The underlayer is sputtered to a thickness of about 200–3,000 Å.

After formation of the underlayer, the substrate is moved downstream on the pallet into another sputtering chamber, where the magnetic layer is sputtered onto the underlayer. One exemplary cobalt-based alloy includes between 70–88% cobalt, 10–28% nickel, and 2–10% chromium, and more preferably, 74–78% cobalt, 15–25% nickel, and 5–10% chromium. Another exemplary cobalt-based alloy for use in forming the magnetic film includes 1–10% tantalum, 10–16% chromium, and 60–85% cobalt.

The magnetic thin film is sputtered onto the underlayer under known conditions to a final thickness of between about 100–800 Å.

In another aspect, the magnetic thin-film layer is composed of sublayers to form a bi-layer or a multi-layer structure. Here, a first magnetic layer is deposited to a thickness of between about 50–400 Å. A chromium-based isolation layer is deposited over the first magnetic layer, to a thickness of between 2–50 Å. By chromium-based, it is meant the isolation layer may be composed of chromium or of a chromium-based alloy. A second magnetic layer is sputtered over the isolation layer, to a desired thickness, typically between 50–400 Å.

After formation of the magnetic thin-film layer, the substrate is carried on the pallet toward a sputtering station at which an overcoat of carbon, silicon oxide or silicon nitride is applied according to known sputtering methods.

III. Media Properties

A. Single Layer Magnetic Thin-film Media

1. Sublayer composed of chromium

In the studies reported below, media having a single magnetic thin-film layer were prepared as follows. A canasite substrate was sputtered with chromium or with a chromium-based alloy to form a sublayer having a selected thickness between 3–100 Å. The sublayer-coated substrate was heated to a temperature of 300° C. After heating, a chromium underlayer was sputtered onto the sublayer to a thickness of 1600 Å. A magnetic thin-film layer was sputtered onto the underlayer, followed by a 175 Å carbon overcoat. The magnetic layer was formed from a CoNiCr (67:25:8) alloy.

Bulk magnetic properties were determined by vibrating sample magnetometry (VSM) conventionally. Magnetic recording testing was carried out on a Guzik Model RWA 501, using a thin-film inductive reading and recording head with a gap length of 0.38 microns, a gap width of 7.25 microns, and a flying height of 2.5 µin. The head inductance was 1.1 µHenry and resistance, 30 ohms. Recording current was 25–30 mAmps for saturation. The AC-SNR was measured at linear densities between 30 and 100 kiloflux change/inch (KFCI).

An X-ray diffraction pattern of a medium formed as described above is shown in FIG. 3A. The sublayer in this medium is composed of chromium and is 10 Å in thickness. The scan is shown after subtraction of the spectrum of the canasite substrate, and shows the Cr (110) reflection at $2\theta=44°$. The Co (00.2) reflection overlaps with the Cr (110) reflection at this angle. A small Cr (211) reflection is observed at $2\theta=82°$.

Figure 3B:
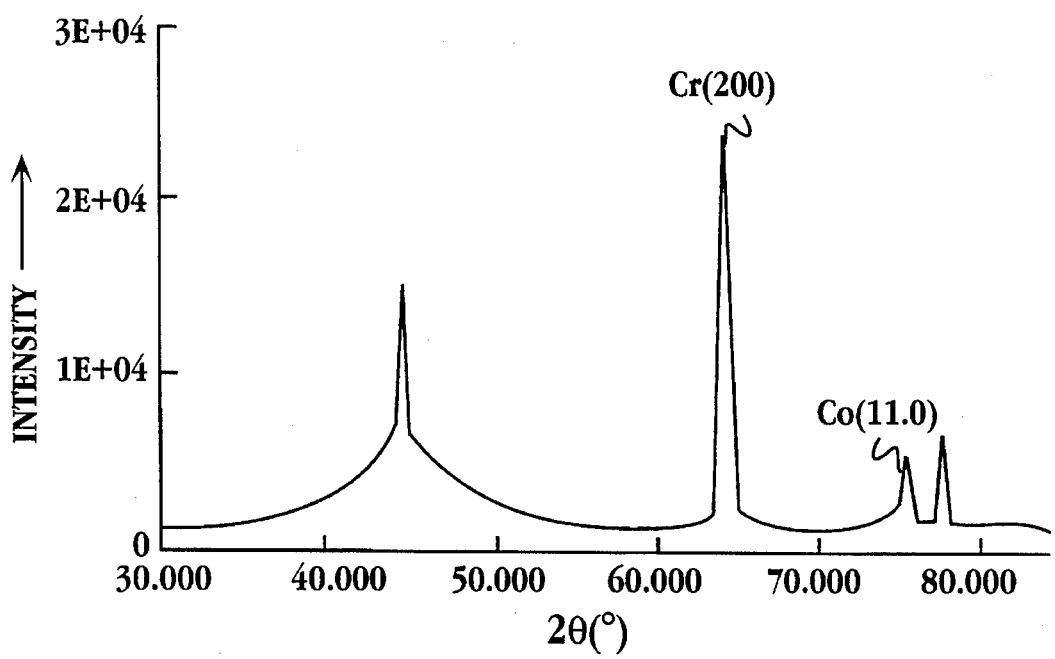

For comparison, an x-ray diffraction pattern of a similar medium having a NiP/Al substrate is shown in FIG. 3B. The crystallographic orientation Cr(200) is formed on metallic substrates and results in a cobalt alloy orientation favorable to a high coercivity, as discussed above.

Table 1 shows the parametrics, at the inner and outer disc diameters, of a magnetic recording medium formed as described above, where the sublayer is composed of chromium and the thickness varies from 0 Å, that is no sublayer present, to 50 Å. The HF signal amplitude measured at the inner diameter increases by 29% after formation of a 10 Å chromium sublayer, and at the outer diameter a 15% increase is observed. Additionally, there are favorable decreases in bit shift (BS) and pulse width (PW 50).

TABLE 1

PARAMETRICS FOR MEDIA FORMED WITH A Cr SUBLAYER

| Thickness of Sublayer (Å) | BH—Hc (Oe) | HF (uV) | RES. (%) | OW (–dB) | PW50 (ns) | BS (ns) |
|---|---|---|---|---|---|---|
| ID:R = 0.466" (HF:4.331 MHz) | | | | | | |
| 0 | 1679 | 186 | 90.1 | 34.3 | 127.3 | 27.4 |
| 10 | 1669 | 240 | 95.1 | 35.6 | 113.1 | 19.0 |
| 20 | 1675 | 239 | 95.2 | 35.0 | 116.4 | 20.1 |
| 30 | 1678 | 238 | 96.3 | 35.0 | 114.5 | 19.5 |
| 40 | 1680 | 230 | 94.2 | 35.3 | 115.1 | 20.3 |
| 50 | 1691 | 224 | 95.4 | 34.8 | 115.8 | 21.9 |
| OD:R = 0.890" (HF:7.084 MHz) | | | | | | |
| 0 | 1679 | 310 | 80.5 | 29.4 | 68.6 | 11.5 |
| 10 | 1669 | 351 | 85.0 | 28.5 | 66.7 | 8.4 |

TABLE 1-continued

PARAMETRICS FOR MEDIA FORMED WITH A Cr SUBLAYER

| Thickness of Sublayer (Å) | BH—Hc (Oe) | HF (uV) | RES. (%) | OW (–dB) | PW50 (ns) | BS (ns) |
|---|---|---|---|---|---|---|
| 20 | 1675 | 344 | 80.5 | 27.8 | 66.9 | 9.0 |
| 30 | 1678 | 339 | 79.9 | 28.6 | 67.4 | 10.6 |
| 40 | 1680 | 338 | 60.6 | 28.3 | 67.5 | 9.0 |
| 50 | 1691 | 327 | 76.7 | 29.2 | 68.1 | 9.8 |

Figure 4:
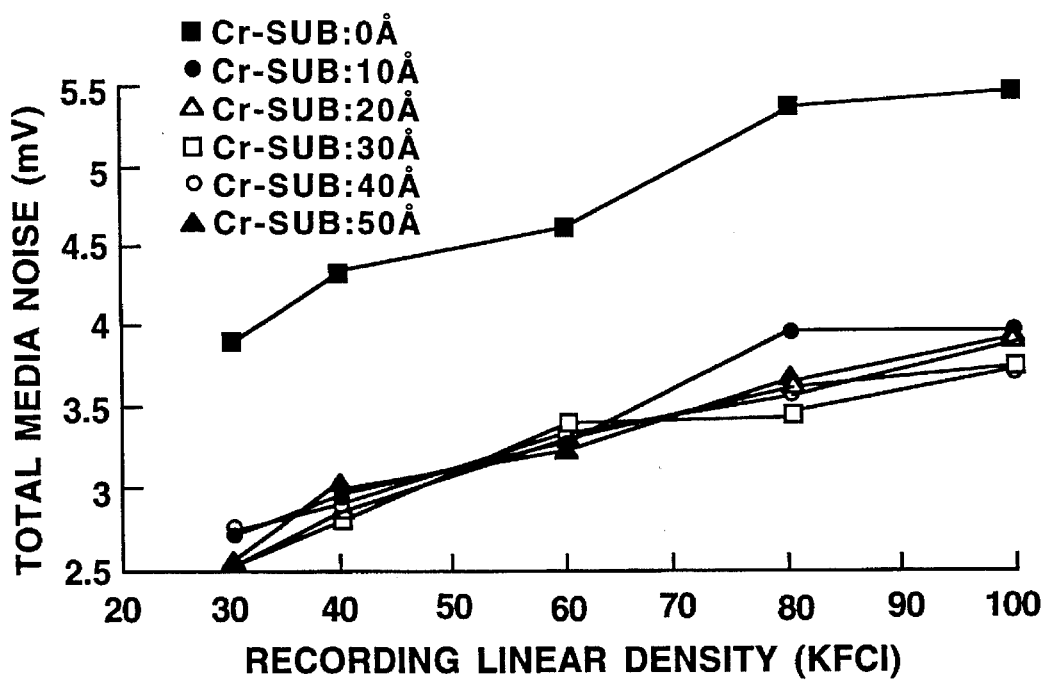
FIG. 4 is a plot of media noise, in mV, as a function of recording linear density, in kiloflux changes/inch, for a magnetic recording medium formed without a Cr sublayer (solid rectangles) and for media formed with a Cr sublayer of varying thickness.

FIG. 4 shows the effect on media noise as a function of recording-linear density of media formed with a chromium sublayer. The thickness of the chromium sublayer was varied from 10–50 Å and compared to a medium formed with no sublayer (e.g., 0 Å). Both types of media, that is with and without a sublayer, were formed on a canasite substrate and the chromium underlayer and magnetic recording layers were the same. The data show that the presence of a sublayer results in a lower media noise.

Figure 5:
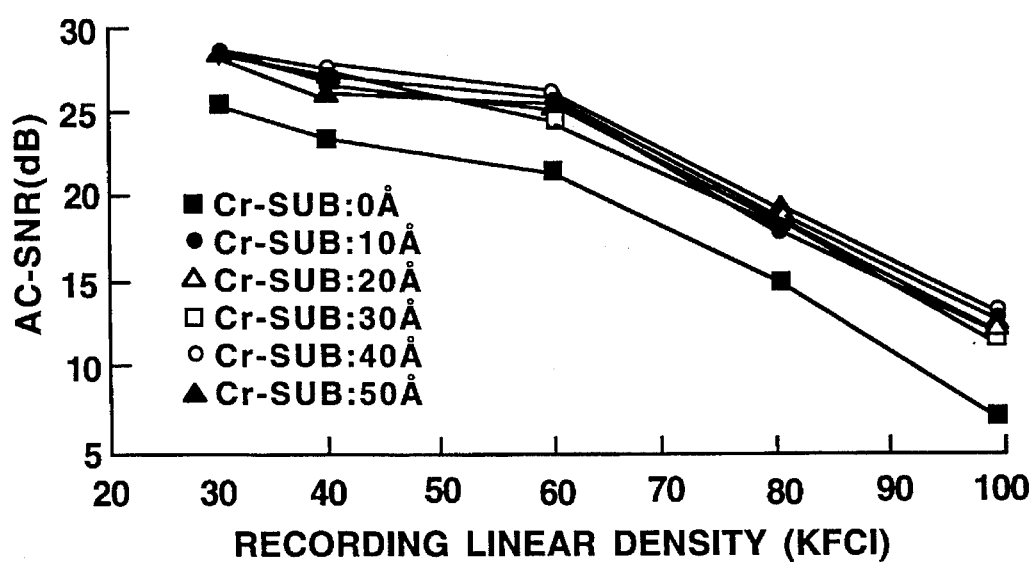
FIG. 5 is a plot of AC-signal to noise ratio in dB, as a function of recording linear density, in kiloflux changes/inch, for a magnetic recording medium formed without a Cr sublayer (solid rectangles) and for media formed with a Cr sublayer varying in thickness.

FIG. 5 shows the effect of the sublayer on signal-to-noise ratio as a function of recording linear density. As in FIG. 4, the media tested differed only in the thickness of the chromium sublayer, where 0 Å represents a medium with no sublayer. At 60 kiloflux changes/in, media with a sublayer have an 18% higher signal-to-noise ratio than the medium with no sublayer.

Thin-film media formed by the method of the present invention, where a sublayer composed of chromium and having a thickness between 3–50 Å is formed, show improved recording properties compared to media formed with no sublayer. As will be seen below, when the sublayer is formed of a chromium-based alloy rather than chromium a further improvement in recording properties is achieved.

2. Sublayer composed of a chromium-based alloy

Magnetic recording media were formed as described in Section IIIA.1 where the sublayer was composed of Cr—Gd, Cr—V, or Cr—Si. A medium having a chromium sublayer was also formed and magnetic recording properties of the media having a sublayer composed of a chromium-based alloy are compared to one having a chromium sublayer.

Table 2 shows inner and outer diameter parametrics for media formed with a 50 Å sublayer of chromium and of the chromium-based alloys Cr—Gd, Cr—V and Cr—Si. The media were formed on canasite substrates and differ only in the composition of the sublayer.

As seen in Table 2, media formed with a sublayer composed of a chromium-based alloy have higher coercivities than the medium formed with a chromium sublayer. For instance, the medium with a Cr—Gd sublayer has a 7% higher coercivity (BH-Hc) than the medium with the chromium sublayer. There are also improvements in the HF signal amplitude (HF) and the signal-to-noise ratio (DC-SNR). Similar improvements are observed at the outer diameter of the disc, with additional improvements in bit shift (BS) and pulse width (PW 50).

TABLE 2

PARAMETRICS FOR MEDIA FORMED WITH 50 Å SUBLAYERS OF Cr AND Cr-BASED ALLOYS

| Sublayer Material | BH—Hc (Oe) | HF (uV) | RES. (%) | OW (−dB) | PW50 (ns) | BS (ns) | DC—SNR (dB) |
|---|---|---|---|---|---|---|---|
| ID:R = 0.466" (HF:4.331 MHz) | | | | | | | |
| Cr | 1606 | 194 | 85.3 | 33.3 | 118.9 | 27.7 | 24.0 |
| Cr—Gd | 1722 | 211 | 90.3 | 33.3 | 114.1 | 27.7 | 25.6 |
| Cr—V | 1694 | 218 | 91.5 | 33.5 | 108.5 | 27.7 | 26.0 |
| Cr—Si | 1715 | 204 | 89.7 | 32.8 | 116.2 | 27.7 | 25.1 |
| OD:R = 0.890" (HF:7.084 MHz) | | | | | | | |
| Cr | 1606 | 317 | 76.9 | 31.9 | 58.5 | 17.1 | 24.5 |
| Cr—Gd | 1722 | 350 | 80.9 | 31.1 | 55.4 | 12.8 | 26.0 |
| Cr—V | 1694 | 346 | 80.8 | 31.1 | 56.3 | 12.7 | 25.9 |
| Cr—Si | 1715 | 331 | 78.2 | 30.8 | 57.8 | 12.7 | 25.6 |

Table 3 shows the parametrics for a magnetic recording medium formed in accordance with the invention where the sublayer is a Cr—Gd alloy. Magnetic recording. properties at the inner and outer diameters of the disc are compared to a medium having a 50 Å chromium sublayer.

The coercivity of a medium having a 20 Å Cr—Gd sublayer is approximately 10% higher than the medium having a chromium sublayer. A 15% improvement in HF signal amplitude is observed, as well as an improved signal-to-noise ratio.

son, a medium having a sublayer of Cr was fabricated. The thickness of the Cr—Si sublayer was varied from 20–200 Å.

The coercivity (BH-Hc) of the medium having a 40 Å Cr—Si sublayer is 1766 Oe, an improvement over the coercivity of 1700 Oe measured for the medium having a 50 Å Cr sublayer. It can also be seen that the optimum thickness of the Cr—Si sublayer for enhancing the coercivity is between about 10–50 Å, as the coercivity decreases in the range 60–200 Å. Improvements, relative to the medium having a chromium sublayer, in HF signal amplitude (HF),

TABLE 3

PARAMETRICS FOR A MEDIUM HAVING A Cr—Gd SUBLAYER COMPARED TO A MEDIUM WITH A Cr SUBLAYER

| Sublayer Material | Thickness of Sublayer (Å) | BH—Hc (Oe) | HF (uV) | RES. (%) | OW (−dB) | PW50 (ns) | BS (ns) | DC—SNR (dB) |
|---|---|---|---|---|---|---|---|---|
| ID:R = 0.466" (HF:4.331 MHz) | | | | | | | | |
| Cr | 50 | 1541 | 182 | 78.0 | 35.7 | 138.2 | 27.7 | 23.8 |
| Cr—Gd | 20 | 1700 | 218 | 89.7 | 35.6 | 126.2 | 27.7 | 25.6 |
| | 40 | 1676 | 210 | 84.2 | 35.1 | 129.1 | 27.7 | 25.3 |
| | 60 | 1692 | 209 | 83.3 | 35.5 | 129.5 | 27.7 | 25.4 |
| | 100 | 1676 | 201 | 83.5 | 34.3 | 134.9 | 17.7 | 24.6 |
| OD:R = 0.890" (HF:7.084 MHz) | | | | | | | | |
| Cr | 50 | 1541 | 298 | 76.9 | 31.4 | 76.6 | 17.6 | 24 |
| Cr—Gd | 20 | 1700 | 353 | 84.2 | 31.3 | 70.8 | 17.4 | 25.8 |
| | 40 | 1676 | 352 | 85.0 | 31.3 | 69.2 | 17.4 | 25.9 |
| | 60 | 1692 | 369 | 83.8 | 31.9 | 67.8 | 17.4 | 26.4 |
| | 100 | 1676 | 340 | 81.3 | 31.3 | 69.7 | 17.4 | 25.4 |

Table 4 shows the parametrics for a magnetic recording medium formed according to the method described above on a canasite disk and with a sublayer of Cr—Si. For comparisignal-to-noise ratio (SNR) and resolution (RES.) were also observed at both the inner and outer disc diameters.

TABLE 4

PARAMETRICS FOR A MEDIUM HAVING A Cr—SI SUBLAYER COMPARED TO A MEDIUM WITH A Cr SUBLAYER

| Sublayer Material | Thickness of Sublayer (Å) | BH—Hc (Oe) | HF (uV) | RES. (%) | OW (−dB) | PW50 (ns) | BS (ns) | DC—SNR (dB) |
|---|---|---|---|---|---|---|---|---|
| ID:R = 0.466" (HF:4.331 MHz) | | | | | | | | |
| Cr | 50 | 1700 | 204 | 89.5 | 34.7 | 131.4 | 20 | 28.3 |

TABLE 4-continued

PARAMETRICS FOR A MEDIUM HAVING A Cr—SI SUBLAYER
COMPARED TO A MEDIUM WITH A Cr SUBLAYER

| Sublayer Material | Thickness of Sublayer (Å) | BH—Hc (Oe) | HF (uV) | RES. (%) | OW (−dB) | PW50 (ns) | BS (ns) | DC—SNR (dB) |
|---|---|---|---|---|---|---|---|---|
| Cr—Si | 20 | 1723 | 220 | 94.3 | 34.8 | 126.2 | 20.5 | 28.9 |
|  | 40 | 1766 | 223 | 93.4 | 35.2 | 126.9 | 19.6 | 28.9 |
|  | 60 | 1667 | 219 | 90.1 | 34.6 | 124.1 | 19.9 | 28.8 |
|  | 100 | 1638 | 209 | 90.6 | 34.4 | 128.2 | 20.5 | 28.6 |
|  | 200 | 1648 | 207 | 91.2 | 34.6 | 127.3 | 19.4 | 28.3 |
|  | OD:R = 0.890" (HF:7.084 MHz) | | | | | | | |
| Cr | 50 | 1700 | 354 | 83.9 | 28.5 | 63.8 | 8.9 | 29.9 |
| Cr—Si | 20 | 1723 | 383 | 85.4 | 29.0 | 63.1 | 10.4 | 29.9 |
|  | 40 | 1766 | 386 | 85.8 | 27.6 | 62.8 | 8.4 | 30.2 |
|  | 60 | 1667 | 383 | 89.3 | 28.4 | 61.8 | 8.4 | 29.9 |
|  | 100 | 1638 | 373 | 85.9 | 28.2 | 62.9 | 8.8 | 29.9 |
|  | 200 | 1648 | 378 | 86.6 | 28.6 | 62.4 | 9.0 | 29.9 |

Figure 6:
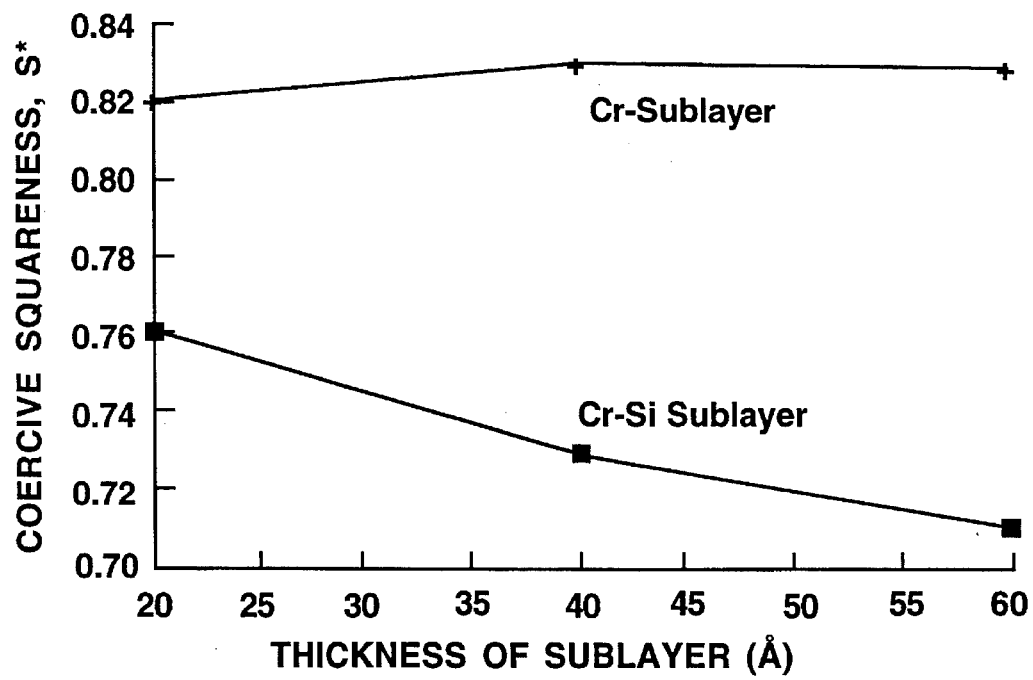
FIG. 6 is a plot of coerciveness squareness against thickness of the sublayer, in Å, where the sublayer is formed of Cr (+symbols) or of Cr—Si (solid rectangles)

FIG. 6 compares the coercive squareness (S*) of a medium formed with a Cr—Si sublayer (solid rectangles) to one having a chromium sublayer (+ symbols). The coercive squareness of the media with the chromium sublayer is essentially constant over the thickness range tested. However, for the medium having a sublayer composed of Cr—Si, as the thickness of the sublayer increases, the coercive squareness decreases. Media having a lower coercive squareness demonstrate a reduction in exchange coupling and a reduction in media noise.

The decrease in coercive squareness of the medium having the Cr—Si sublayer makes this longitudinal magnetic recording medium particularly suited for use with an inductive write-head and magnetoresistive read head combination. A magnetoresistive read/inductive write head combination is sensitive to the readback signal from the disc and at the same time optimized to write to media with low coercive squareness for low noise, high density recording.

Figure 7:
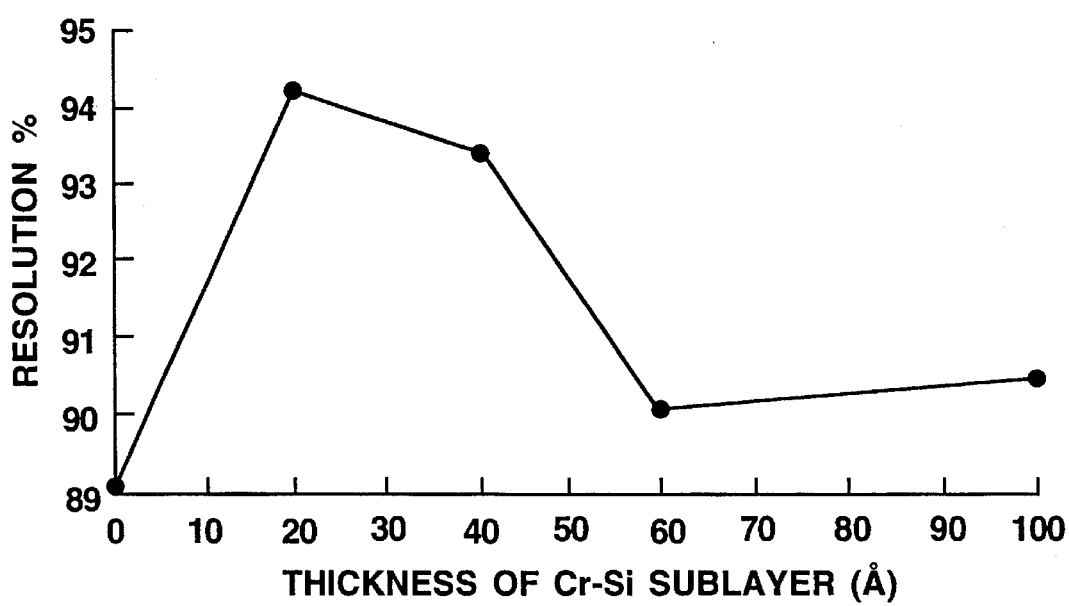
FIG. 7 is a plot of resolution, in per cent, as a function of thickness of the Cr—Si sublayer, in Å.

Media resolution as a function of thickness of the Cr—Si sublayer is shown in FIG. 7. Resolution increases as the sublayer increases in thickness up to about 20 Å. At thicknesses above about 40–50 Å, the resolution decreases significantly, indicating a preferred range for the thickness of the sublayer is between about 3–40 Å.

Figure 8A:
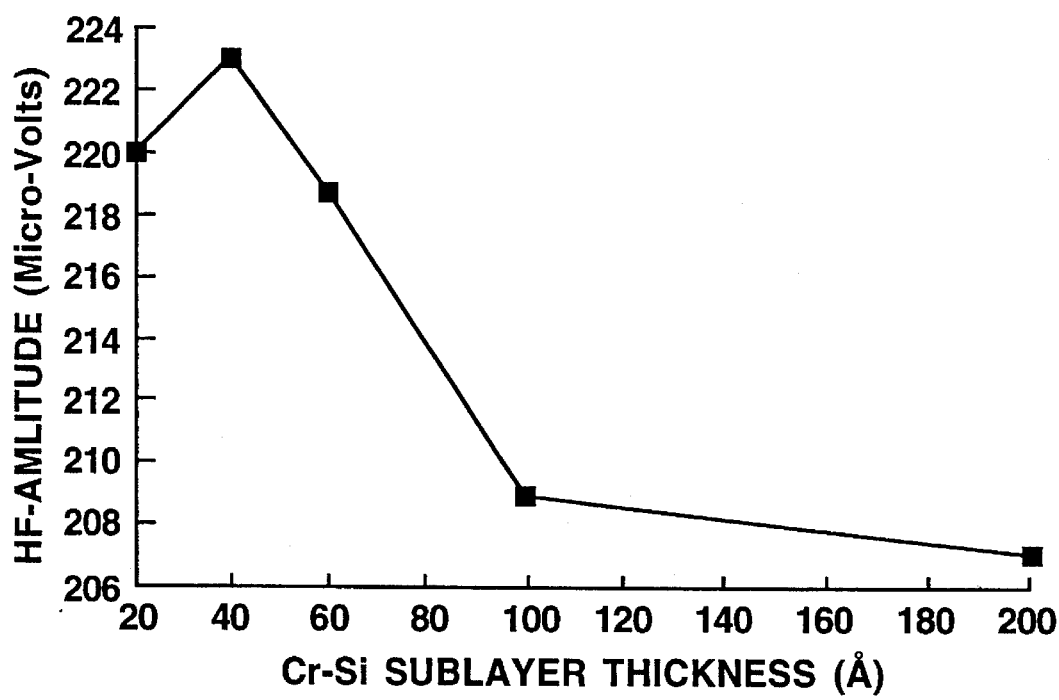
FIGS. 8A–8B are plots of HF-signal amplitude, in microvolts, as a function of thickness of the Cr—Si sublayer, in Å, measured at the inner diameter of the disc (FIG. 8A) and at the outer diameter (FIG. 8B)
Figure 8B:
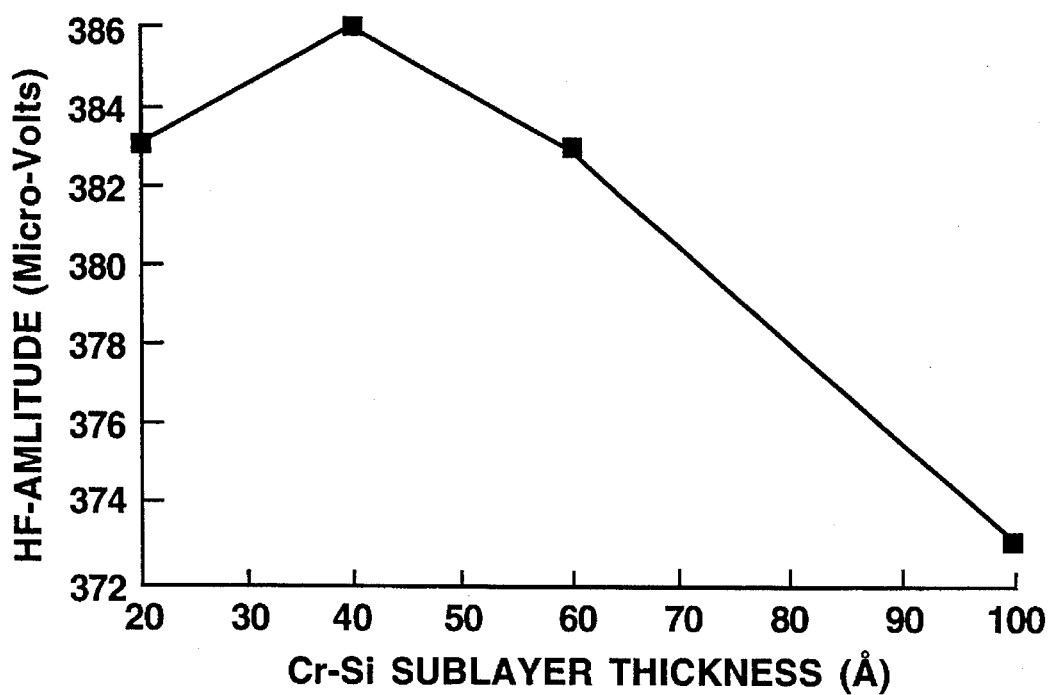

FIGS. 8A–8B show the effect of Cr—Si sublayer thickness on HF-signal amplitude. At the inner diameter of the disc (FIG. 8A) a peak in HF signal amplitude is seen at 40 Å, with a decrease in signal amplitude beyond this thickness. At the outer diameter of the disc (FIG. 8B), the signal amplitude also peaks at a sublayer thickness of 40 Å, with a gradual decrease in signal amplitude as the thickness of the Cr—Si sublayer increases.

As seen in the foregoing data, formation of a sublayer in longitudinal magnetic recording media formed on a canasite substrate is effective to improve the magnetic recording properties. When the sublayer is formed of chromium and compared to a medium having no sublayer, an improvement of approximately 15–30% is obtained in the HF signal amplitude (Table 1) along with a reduction in media noise (FIG. 4) and an increase of approximately 18% in signal-to-noise ratio (FIG. 5). Media having a sublayer composed of Cr—Gd, Cr—V, or Cr—Si show improvements in HF signal amplitude, signal-to-noise ratio and coercivity relative to a medium having a chromium sublayer (Table 2).

B. Multi-Layer Magnetic Thin-film Media

Section III A above, discussed media having a single magnetic recording layer. Experiments in support of the invention were also performed on media where the magnetic recording layer was composed of a first and a second sublayer separated by a chromium isolation layer, giving a bi-layer magnetic recording medium.

Bi-layer magnetic recording media were prepared on a canasite or a glass substrate and with a chromium sublayer having a thickness of 20 Å. After sputtering the sublayer onto the substrate, the sputtering was stopped and the sublayer-coated substrate was heated to 300° C. A chromium underlayer was then sputtered to a thickness of 1150 Å. A first CoNiCr (62.5/30/7.5) magnetic layer was deposited, followed by a 10–20 Å chromium isolation layer. A second CoNiCr magnetic layer, 122 Å in thickness, was sputtered over the isolation layer. A carbon overcoat of 200 Å was then deposited.

Figure 9:
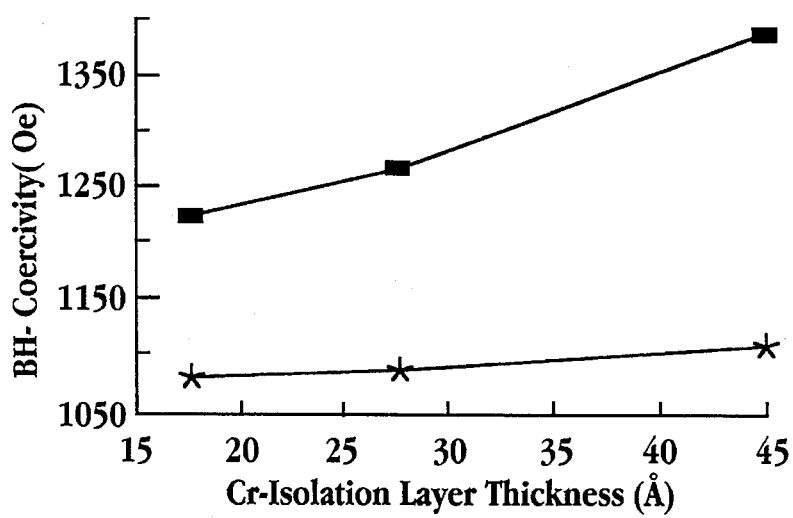
FIG. 9 is a plot of coercivity, in Oe, as a function of thickness of the chromium isolation layer, in Å, for media having a bi-layer magnetic recording layer separated by a chromium isolation layer, where the media are formed on a canasite substrate (solid rectangles) with a chromium sublayer or formed on a NiP/Al substrate with no sublayer (* symbols)

FIG. 9 shows the coercivity for a bi-layer magnetic recording medium formed as described above on a canasite substrate (solid rectangles) as a function of thickness of the chromium isolation layer. For comparison, a bi-layer medium was formed on a NiP/Al substrate and without a chromium sublayer (* symbols). The coercivity of the medium formed on the canasite substrate with a sublayer is between 10–20% higher than the medium having no sublayer and formed on a NiP/Al substrate.

Figure 10:
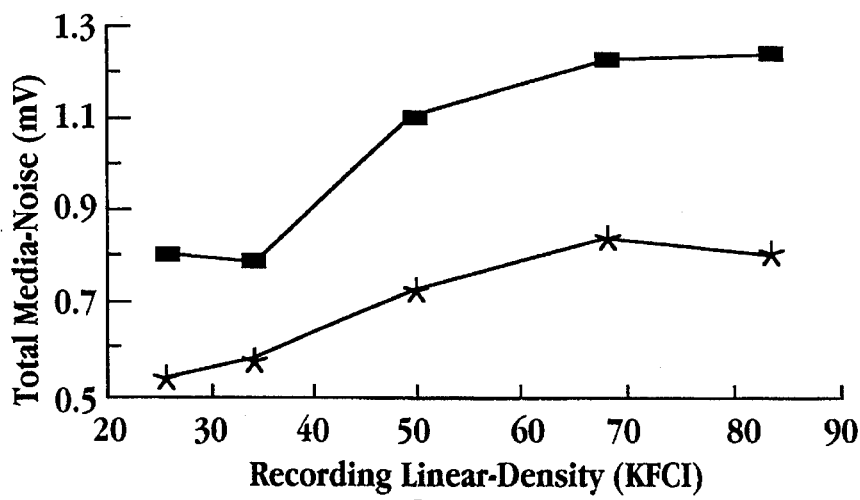
FIG. 10 is a plot of media noise, in mV, as a function of recording linear density, in kiloflux changes/inch, for media having a single magnetic recording layer (solid rectangles) or having a bi-layer magnetic recording layer separated by a 20 Å chromium isolation layer (* symbols)

FIG. 10 compares media noise, in mV, as a function of recording linear density, in kiloflux changes/inch, for a bi-layer magnetic recording medium formed on a canasite substrate and having a 20 Å isolation layer (* symbols) to a medium having a single magnetic recording layer (solid rectangles), also formed on a canasite substrate. Both media have a 20 Å thick chromium sublayer. A reduction in media noise for the medium formed with an isolation layer is seen over the entire recording linear density range tested.

Figure 11:
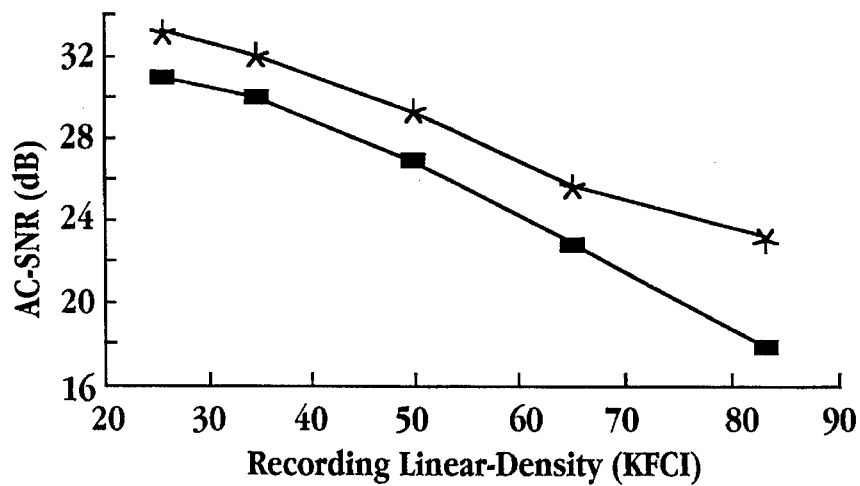
FIG. 11 is a plot of signal-to-noise ratio, in dB, as a function of recording linear density, in kiloflux changes/ inch, for media having a single magnetic recording layer (solid rectangles) or having a bi-layer magnetic recording layer separated by a 15 Å chromium isolation layer (* symbols).

FIG. 11 shows the signal-to-noise ratio for a medium formed on a glass substrate, with a 20 Å chromium sublayer, and with a bi-layer magnetic recording structure separated by a 15 Å chromium isolation layer (* symbols). Also shown is a similar medium except having a single magnetic recording layer (solid rectangles). The medium having a bi-layer magnetic recording structure has a higher signal-to-noise ratio than the medium with a single magnetic recording layer.

From the foregoing, it can be appreciated how various objects and features on the invention are met. The longitudinal magnetic recording media described are formed on a non-metallic substrate, permitting lower flying heights, which is a desirable feature for high recording density. The media are formed by sputtering a thin, 3–50 Å, sublayer composed of chromium or of a chromium-based alloy onto the substrate. The sputtering process is interrupted, or discontinued momentarily, while the sublayer-coated substrate is heated. A chromium-based underlayer, that is an underlayer of chromium alone or of a chromium-based alloy is then deposited. Each of these steps are done inside the vacuum chamber of the sputtering apparatus.

The magnetic recording layer of the media may be single layer or bi-layer separated by a chromium or chromium-based alloy isolation layer.

Media formed with a chromium sublayer and a single magnetic recording layer are characterized by improved coercivity, HF signal amplitude, and signal-to-noise ratio, when compared to a medium in the absence of the sublayer.

Media formed with a sublayer composed of a chromium-based alloy and a single recording layer have an improved HF signal amplitude and coercivity compared to a similar medium with a sublayer formed of chromium alone.

Although the invention has been described with respect to particular embodiments, it will be apparent to those skilled in the art that various changes and modifications can be made without departing from the invention.

It is claimed:

1. A magnetic recording medium, comprising a non-metallic substrate;

formed on the substrate, a sputtered sublayer composed of chromium or a chromium-based alloy containing at least 50% chromium, said sublayer having a thickness between 3–50 Å;

formed directly on the sublayer, a sputtered chromium underlayer having a thickness between 200–3,000 Å;

formed on the underlayer, a sputtered cobalt-based magnetic layer having a thickness between 100–800 Å; and a wear-resistant overcoat.

2. The medium of claim 1, wherein said alloy is selected from the group consisting of Cr—Si, Cr—V, and Cr—Gd.

3. The medium of claim 1, wherein said alloy is Cr—Gd and said sublayer has a thickness between 10–30 Å.

4. The medium of claim 1, wherein said alloy is Cr—V and said sublayer has a thickness between 10–30 Å.

5. The medium of claim 1, which is characterized by a substantially higher signal-to-noise ratio than the same medium having a sublayer formed of chromium alone.

6. The medium of claim 1, wherein said magnetic layer is composed of first and second magnetic sublayers separated by a chromium-based isolation layer.

7. In a method of producing a magnetic recording medium by sputtering onto a non-metallic substrate a chromium underlayer having a thickness of between 200–3,000 Å, and sputtering a cobalt-based alloy onto said underlayer to form a magnetic thin-film layer having a thickness between 100 and 800 Å, the improvement comprising the steps of (i) sputtering a sublayer, composed of chromium or a chromium-based alloy containing at least 50% chromium, onto the non-metallic substrate, between said underlayer and said substrate; and (ii) prior to sputtering said underlayer, stopping said sublayer sputtering when a thickness between 3–50 Å is reached.

8. The method of claim 7, wherein said sublayer is composed of an alloy selected from the group consisting of Cr—Gd, Cr—V, and Cr—Si.

9. A magnetic recording medium, comprising a non-metallic substrate;

formed on the substrate, a sputtered chromium sublayer having a thickness between 3–50 Å;

formed directly on the sublayer, a sputtered chromium-based underlayer having a thickness between 200–3,000 Å;

formed on the underlayer, a sputtered cobalt-based magnetic layer having a thickness between 100–800 Å; and a wear-resistant overcoat.

10. The medium of claim 9, wherein said sublayer is between 10–30 Å in thickness and said medium is characterized by a HF signal amplitude which is at least 10% higher than the same medium in the absence of said sublayer.

11. The medium of claim 9, wherein said sublayer is between 10–30 Å in thickness and said medium is characterized by a media noise which is at least 20% lower than the same medium in the absence of said sublayer.

12. The medium of claim 9, wherein said magnetic layer is composed of first and second magnetic sublayers separated by a chromium-based isolation layer.

* * * * *